(12) United States Patent
Ippolito

(10) Patent No.: US 7,984,774 B2
(45) Date of Patent: Jul. 26, 2011

(54) QUICK-RECHARGING ENERGY FEEDING SYSTEM FOR MEANS OF TRANSPORT WITH ELECTRIC TRACTION

(75) Inventor: Massimo Ippolito, Berzano di San Pietro (IT)

(73) Assignee: Sequoia Automation S.R.L., Chieri (IT)

( * ) Notice: Subject to any disclaimer, the term of this patent is extended or adjusted under 35 U.S.C. 154(b) by 320 days.

(21) Appl. No.: 12/376,286

(22) PCT Filed: Aug. 1, 2007

(86) PCT No.: PCT/IT2007/000554

§ 371 (c)(1),
(2), (4) Date: Feb. 3, 2009

(87) PCT Pub. No.: WO2008/020463

PCT Pub. Date: Feb. 21, 2008

(65) Prior Publication Data

US 2009/0272587 A1 Nov. 5, 2009

(30) Foreign Application Priority Data

Aug. 17, 2006 (IT) .............................. TO2006A0610

(51) Int. Cl.
*B60L 9/30* (2006.01)
(52) U.S. Cl. ........................................ 180/2.1; 320/109
(58) Field of Classification Search .................... 180/2.1, 180/2.2; 320/101, 104, 108, 109, DIG. 36
See application file for complete search history.

(56) References Cited

U.S. PATENT DOCUMENTS

| RE29,994 E | 5/1979 | Bossi | |
|---|---|---|---|
| 4,158,802 A * | 6/1979 | Rose, II | 320/109 |
| 5,573,090 A * | 11/1996 | Ross | 191/10 |
| 5,821,728 A * | 10/1998 | Schwind | 320/108 |
| 6,557,476 B2 * | 5/2003 | Batisse | 104/289 |
| 7,248,017 B2 * | 7/2007 | Cheng et al. | 320/108 |
| 7,451,839 B2 * | 11/2008 | Perlman | 180/2.1 |

FOREIGN PATENT DOCUMENTS

| EP | 1 228 919 A2 | 8/2002 |
|---|---|---|
| FR | 2 271 952 A | 12/1975 |
| FR | 2 794 695 A | 12/2000 |
| GB | 2 185 866 A | 7/1987 |
| JP | 09 028 922 A | 2/1997 |

OTHER PUBLICATIONS

Ogasawara, Haruo, Patent Abstracts of Japan, Publication No. 09028922, Feb. 4, 1997 (corresponds to JP 09 028 922).
Sequoia Automation S.R.L. et al., Written Opinion of the International Searching Authority and International Search Report issued in International Patent Application No. PCT/IT2007/000554 on Dec. 14, 2007.

* cited by examiner

*Primary Examiner* — John Walters
(74) *Attorney, Agent, or Firm* — David A. Farah; Sheldon Mak & Anderson PC

(57) ABSTRACT

A quick-recharging energy feeding system is described, for a transport vehicle with electric traction, performed in every foreseen stop of the vehicle by means of a connection that can be directly and automatically performed next to such stop, through a road bed, comprising at least one recharging subsystem arranged on the vehicle and at least one stationary system cooperating with the recharging subsystem for transmitting electric energy.

12 Claims, 3 Drawing Sheets

QUICK-RECHARGING ENERGY FEEDING SYSTEM FOR MEANS OF TRANSPORT WITH ELECTRIC TRACTION

CROSS-REFERENCE TO RELATED APPLICATION

The present Application is a national stage of International Patent Application No. PCT/IT2007/000554, titled Quick-Recharging Energy Feeding System for Means of Transport with Electric Traction, filed Aug. 1, 2007 which takes priority from Italian Patent Application No. TO2006A000610 filed on Aug. 17, 2006, the contents of which are incorporated in this disclosure by reference in their entirety.

BACKGROUND INFORMATION

1. Field of the Invention

The present invention refers to a quick-recharging energy feeding system for means of transport, in particular of the collective type, with electric traction.

2. Description of Prior Art

As known, the type of motor traction currently known and used more or less experimentally depends on chemical sources or vectors, which bring about strong penalties in terms of efficiency. All other arrangements, such as for example hydrogen, cannot claim use efficiencies exceeding 7% of the originally invested energy. Moreover, currently, in the scientific world, intense discussions are held about the limit represented by batteries, in particular as regards the weight to be transported. The enormous improvement of performances of batteries of accumulators disclose the possibility of approaching the order of magnitude of autonomies obtained with liquid fuels. Currently, the most promising accumulators use lithium polymers, but their use on portable telephones and computer has already demonstrated their foreseeable extraction limits. Moreover, the life cycle of these accumulators is also a problem: in fact, following a small number of recharge cycles, they drastically reduce their performance, imposing a replacement of the whole battery pack, that in case of the electric traction, is composed of a few quintals of costly manufactured products both for producing them and for disposing or recycling them.

In such context, the term "feeding" defines a partial recharge of the batteries that are a piece of equipment of an autonomous electric means of locomotion. The term is used to point out the recharge operation that it is possible to perform, using currently available technologies, when the locomotion means stops in suitably equipped areas (for example, the terminus of urban and extra-urban bus lines). Current arrangements suffer the intrinsic impossibility of traditional accumulators to accept high recharging currents and the need of reducing to a minimum the vehicle stop times, de facto compelling to perform only partial battery recharges. The state of the art of the feeding technology, adopted by some urban transport companies on lines served by minibuses (12 places, 10.5 tons), has as characteristic an extension of the daily autonomy of electric vehicles, which anyway require a slow recharge during the night before being able to restart the service.

The technology to transfer very high electric powers on vehicles is anyway already known with pantograph of railway locomotives. The chance of exploiting not very short stops of the electric vehicle (on the order of 10 minutes) is also known, to perform a partial recharge of the accumulators in order to increase their daily autonomy.

Currently, the state of the art of conductive or inductive feeding techniques does not allow, with the same vehicle sizes, to extend the autonomy of electric vehicles to the kilometers traveled provided by operating plans of endothermic vehicles used for collective transport. Moreover, the need of having at least 10 minutes available every hour to perform a partial recharge of the accumulators, does not allow extending the advantages of the electric traction outside the strictly urban context.

The art further proposed a simpler system for implementing the braking regeneration on vehicles operated by an endothermic motor as disclosed in European Patent Application n. 6018745.7, filed on Jul. 9, 2006 by the same Applicant. In particular, the described system is substantially a smart battery that uses super-capacitors coupled with a power electronics that complement the electrochemical vehicle battery. This coupling allows high energy savings, modulating the effects depending on accelerations.

Currently, culture and art, but above all investments related to infrastructures dedicated to transports on tires, are such as to be able to support the chance of demanding to the infrastructures themselves, and therefore the territory, some of the needs of the vehicle, from autonomy to actual traction members.

SUMMARY OF THE INVENTION

Object of the present invention is solving the above prior art problems by providing a quick-recharging energy feeding system for means of transport, in particular of the collective type, with electric traction that provides for the use of super-capacitors in place of or together with known accumulators, allowing to substantially decrease the recharge times.

Another object of the present invention is providing a quick-recharging energy feeding system that allows improving known art limits dealing with energy accumulation on board the vehicle.

The above and other objects and advantages of the invention, as will result from the following description, are obtained with a quick-recharging energy feeding system for means of transport with electric traction as described in claim 1. Preferred embodiments and non-trivial variations of the present invention are the subject matter of the dependent claims.

It will be immediately obvious that numerous variations and modifications (for example related to shape, sizes, arrangements and parts with equivalent functionality) can be made to the described system without departing from the scope of the invention as results from the enclosed claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF PREFERRED EMBODIMENTS

Figure 1:
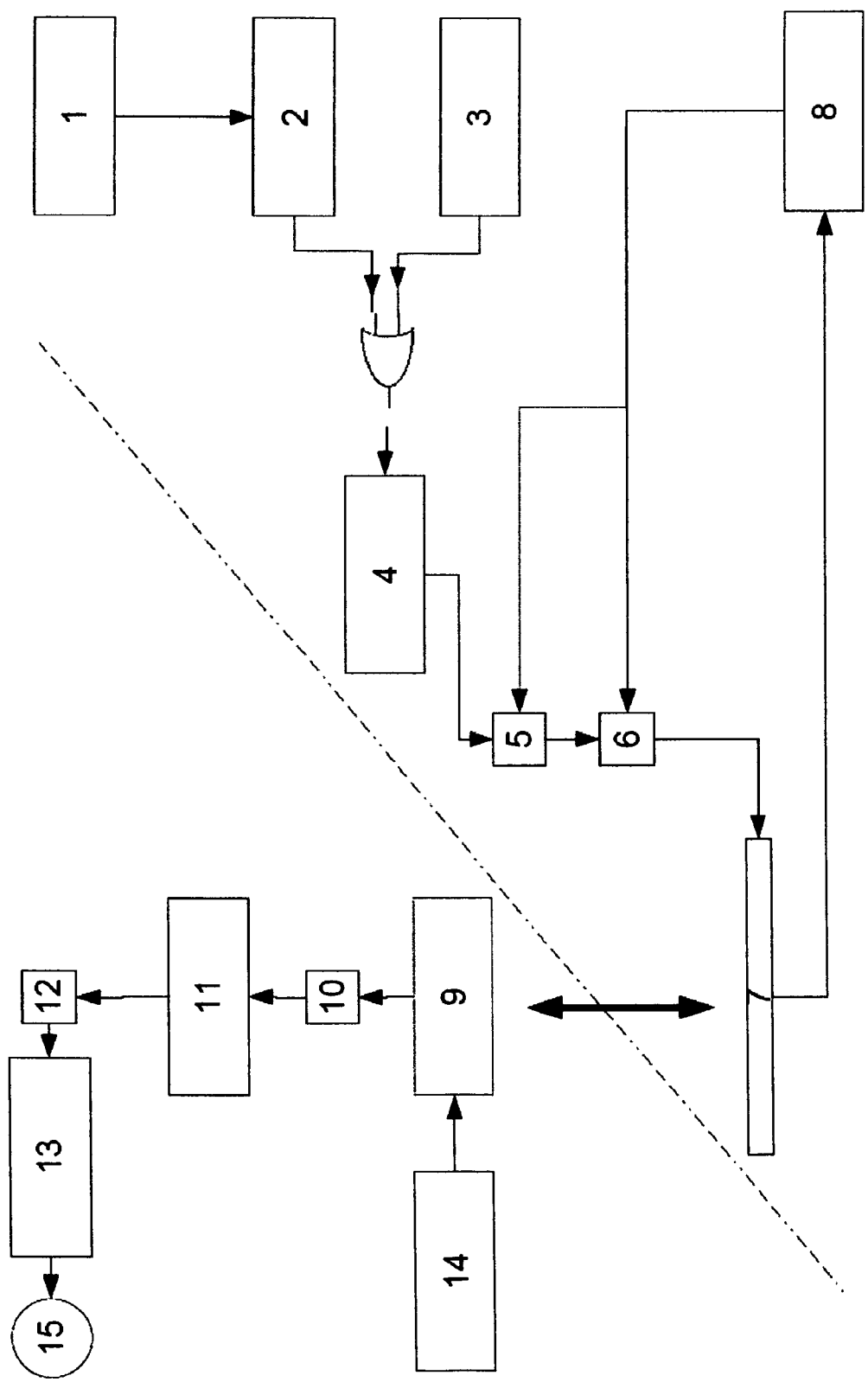
FIG. 1 shows a block diagram representing the main components of the quick-recharge feeding system of the present invention.
Figure 2:
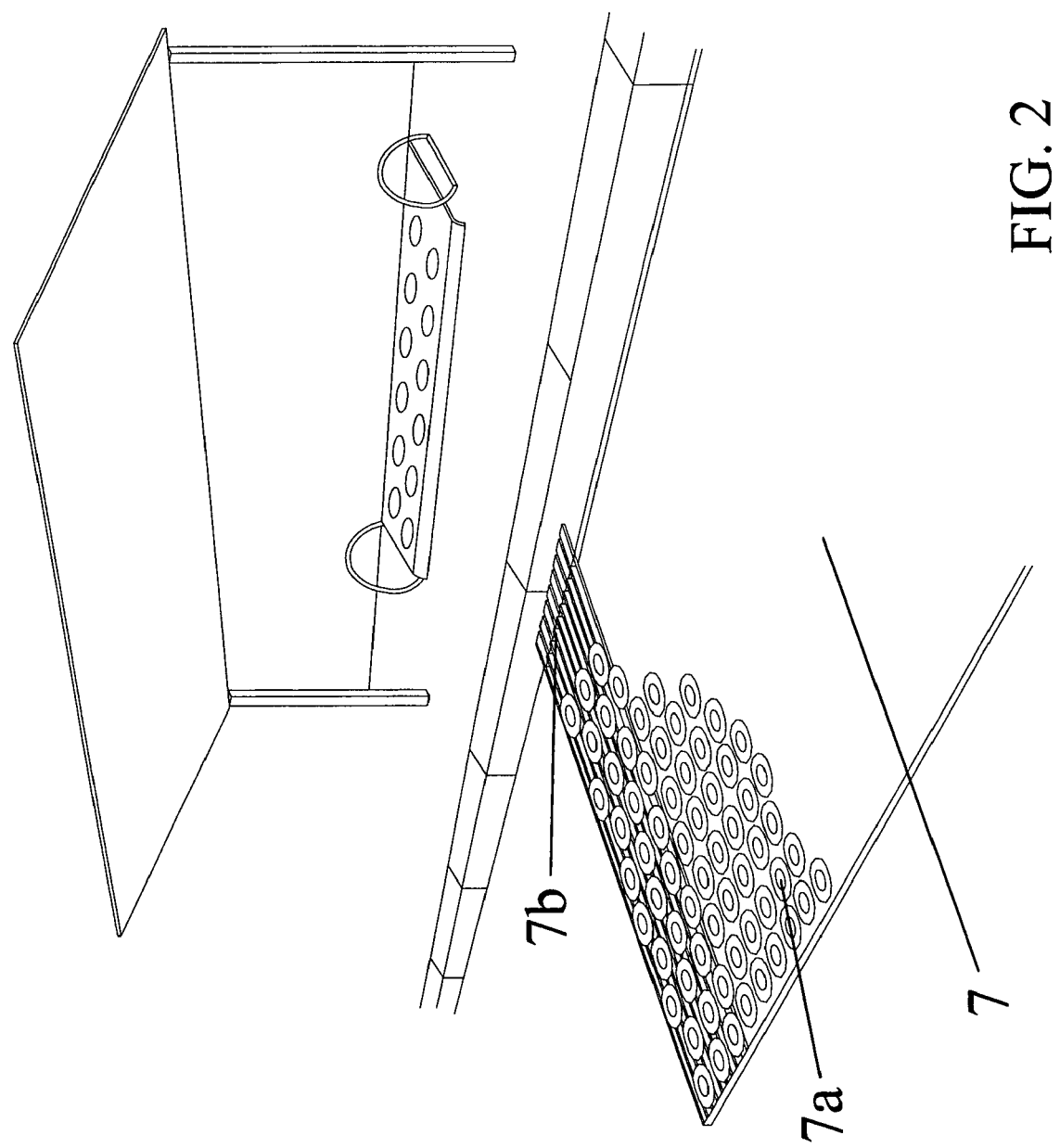
FIG. 2 shows a perspective view of a preferred embodiment of a rectangular array of electric contacts placed on the ground for the system according to the present invention.
Figure 3:
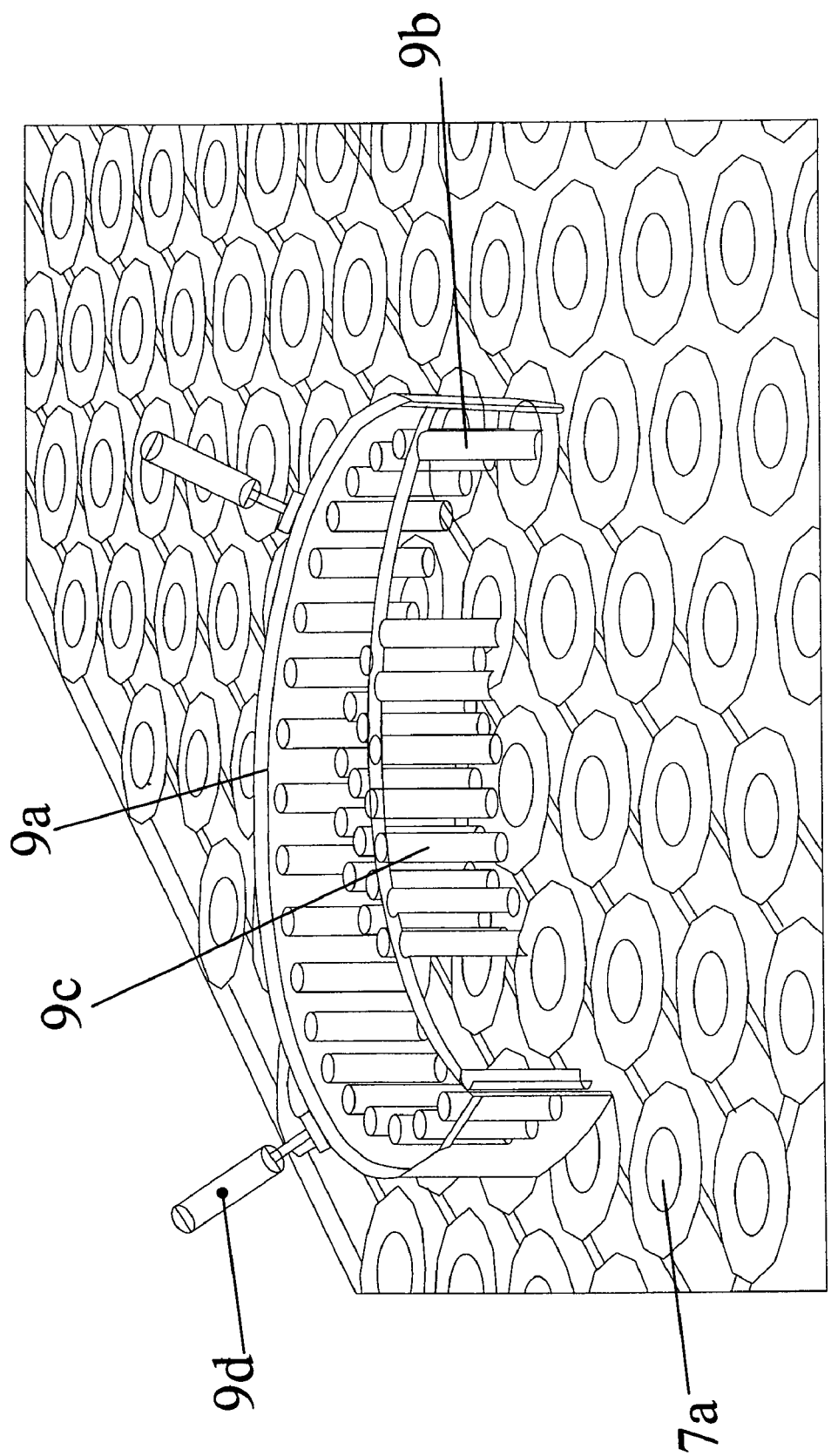
FIG. 3 shows a perspective and partially sectioned view of a preferred embodiment of a tap counter-array for performing an energy exchange between a vehicle and the territory in the system according to the present invention.

In general, as will be seen more in detail in the following description, the quick-recharging energy feeding system of a transporting vehicle, in particular of the type used for the collective transport, according to the present invention can be performed upon every foreseen stop of the vehicle itself by means of a connection that can be performed directly and automatically from the road bed or through another connection that allows transferring the necessary energy under safety conditions, taking into account the unavoidable casual approaching of the vehicle when stopping.

The flexibility required by the present invention provides on one hand a connection that can be directly and automatically performed next to the foreseen vehicle stop, and on the other hand the possibility of transferring to the vehicle the necessary energy to travel along the road section separating it from the following recharging point (the following stop) within a time that is compatible with the stop length to allow passengers to go into and out of the vehicle.

With reference to the Figures, the system according to the present invention can be divided into two parts: a recharging subsystem as vehicle equipment, and a stationary system adapted to transmit electric energy to such recharging subsystem.

In particular, the subsystem as vehicle equipment, that is substantially an electric means supplied by accumulators 13 and possibly equipped with braking regeneration capability 15, comprises:

- at least one battery of super-capacitors 11;
- at least one feeling tap counter-array 9 suspended under the vehicle flatbed;
- a conversion and control electronics, respectively 12 and 14.

The battery of super-capacitors 11 can be placed everywhere on the means of transport or can be distributed in its various spaces. Assuming a dimensioning for collective transport, approximately 300 litres of volume with 400 kg of weight are necessary to obtain the required energy. The connection will be of the serial and parallel type, in order to reach voltages and amperages that are compatible with the switching devices of the conversion and control electronics 12 e 14.

The conversion and control electronics 12 and 14 performs the functions of battery recharging, complements the batteries when the electric absorption of the vehicle engine so requires, manages the tap counter-array 9 operation, supervises the quick recharge function of the super-capacitors 11 when the feeding contact is established.

The contacts can also establish a data communication for providing the coupling position, namely recognise the contacts foreseen to be at a high potential with respect to ground contacts; moreover, it is possible to transfer vehicle identification and measures of amounts of transferred energy in order to also provide a functional monitoring or an accounting in order to invoice the performance.

The tap counter-array 9 is composed of a plate 9a placed under the vehicle flatbed that houses a set of electric conduction contacts, preferably made as spring ferrules 9b and 9c to establish the electric contacts arranged with an array ordering.

The tap counter-array 9 will have a typology compatible with the array of the ground station mentioned below, so that the greatest number of parallel contacts are formed under any casual coupling condition. A possible embodiment of such counter-array provides for the presence of a crown of spring contacts aimed to perform the contact with the ground potential, separated as much as to avoid short-circuit phenomena from the spring ferrules 9c placed in the counter-array centre (at least the diameter of the cells 7a of the mat 7 including insulation and described below).

The plate 9a is moved in two positions, a retracted position that avoids that the contacts can be damaged when the vehicle circulates, and an extended position or a position pressed on the pavement under the energy transfer phase. At least three linear actuators 9d are needed for performing the extension manoeuvre and the following retraction.

In order to protect and keep the spring ferrules 9b and 9c cleaned, a coverage is advisable towards the road side that, in the operating phase, is retracted, as if it were a sliding door or a shutter, or else the cover could remain in position and be crossed by the individual spring ferrules 9b and 9c that project from orifices. In this case the cover will have to be made of insulating or rubbery material.

The safety of the quick-recharging energy feeding system of the present invention is greatly demanded to the feeding station described herein below in detail. A protection on the current transit is provided on board the means through the fuse 10 placed between counter-array 9 and battery of super-capacitors 11.

The stationary system of the system according to the present invention instead is a feeding station connected to the electric mains 3 and composed of an insulating mat 7, that houses plane metal contacts 7a, placed on the road bed, a managing and control electronics 8, safety systems 5 and 6, an energy accumulation capacity both with electro-chemical accumulators 2 and with super-capacitors 4, and possibly at least one photovoltaic cantilever roof 1. The mat 7 houses the plane contacts 7a organised in a honeycomb array; each contact is exposed to the surface and connected to a single lead 7b embedded into the insulating mat 7; all leads converge to a side of the mat 7 to reach the connections in the cabinet of the managing and control electronics 8. The sizes of the mat 7, with respect to the counter-array 9 assembled on the vehicle, are such as to allow the driver a good approximation when approaching the stop, in order to reduce to a minimum the probability of a lack of contact due to a wrong positioning of the vehicle with respect to the mat.

The managing and control electronics 8 administrates all operating steps of the system. Since it is not possible to foresee the exact position of the vehicle when stopping, the managing and control electronics equipping every contact 7a is able to connect the element both to the high electric potential polarity and to the ground potential, depending on the coupling that every time is performed between mat 7 and counter-array 9.

Safety is a major aspect in the description and realisation of the present invention. For this reason, the system of the present invention has several arrangements aimed to increase safety, each one operating at a different level. The first level is intrinsic in the geometry for realising the contact that is electronically managed: once the vehicle stops at a stop, the actuating system makes the counter-array 9 descend towards the road bed, so that the spring ferrules 9b exert pressure onto the mat 7. When the contact occurs, the managing and control electronics 8 connects to the ground potential the spring ferrules 9b present on the peripheral crown of the counter-array 9, while the spring ferrules 9c included in said peripheral crown are connected to a high potential. This guarantees the physical insulation of a high voltage from the surrounding space. A second intrinsic safety level of the system described by the present invention is represented by voltages and currents determined depending on the time established for performing the energy transfer between vehicle and cantilever roof through the contact between spring ferrules 9b and 9c of the counter-array 9 and contacts 7a placed on the mat 7. The right compromise must minimise the necessary voltage for transferring 5 MJ of energy in a time compatible with the vehicle stopping at the stop, taking into account the maximum current that can be transferred though the number and sizes of available contacts. Assuming to build a counter-array 9 equipped with N spring ferrules 9b, taking into account a stop of 10 seconds, the necessary power is equal to 500 kW. If a voltage of 1000 V has to be made available, for reasons of safety, the current must be equal to 500 A.

The system described by the present invention is preferably equipped with at least two real-time diagnostics systems operating in parallel. The first system operates at individual hardware level for each contact 7a of the mat 7, verifying that, instant by instant, each contact is at the ground potential. If even only one contact is at a high potential, after a delay time has passed that is comparable with the length of the energy transfer procedure, the system takes care of immediately and definitively insulating all contacts through a contact breaker 5. The second system collectively operates at bus level on the contacts 7a of the mat 7, through a logic that continuously verifies the agreement between foreseen status (ground potential or high potential) and actual status. In a negative case, the system takes care of checking the current flow through a current limiter 6, till all contacts are finally insulated.

The electro-chemical accumulators and the super-capacitors that are equipment of the feeding station can be placed in a space obtained underground, or in a suitable cabin that houses the managing and control cabinet 8.

Providing the cantilever roof with super-capacitors, in addition to the energy accumulation capability, opens a further and interesting chance. If one imagines an extra-urban service, the cantilever roofs could be placed in positions exposed to the sun. If the cantilever roof is provided with a photovoltaic cover, the recharging of super-capacitors could be obtained directly from the sun. The photovoltaic cantilever roof 1 is a traditional cantilever roof made of metal, wood or another material whose roof houses at least one photovoltaic panel whose sizes are necessary for charging the accumulators 2 with the necessary energy for recharging the vehicle arriving to a stop.

The ground super-capacitors as equipment of the cantilever roof, coupled with those on board the vehicle, guarantee quick energy exchange operations between vehicle and cantilever roof.

The presence of the photovoltaic panel makes it necessary to provide the cantilever roof with necessary accumulators for stocking the produced energy. Since the cantilever roof is connected to the electric mains 3, under particular conditions depending on topology and operating conditions of the transport line, the produced energy can be entered onto the electric mains.

The operation provides that the mains or the photovoltaic panel supply the recharging of accumulators and super-capacitors; the presence of the super-capacitors can reduce to a minimum the cycles and the discharge and recharge depth, in addition to the maximum accumulator current, prolonging their life and increasing the electro-chemical conversion efficiency.

According to the system of the present invention, therefore, a section of round facing the cantilever roofs of stops of public means of travel can be equipped with the rectangular array 7 of ground electric contacts 7b that are normally neutral, namely inactive.

When the vehicle arrives to a stop and stops onto such array, the counter-array of tap contacts 9 as vehicle equipment is made descend and is overlapped to the mat of contacts 7, establishing galvanic continuities, with an unavoidable level of position casualty, since the driver cannot be required to always stop with the necessary accuracy to realise predetermined contacts. It must be noted that, in an alternative embodiment thereof, contacts of the feeling system could be of the sliding or revolving type, being for example an equipment of routes reserved for the recharging to allow the recharging itself without requiring the vehicle to stop.

Then, a communication is activated between the two arrays in order to determine position and activation schemes of the power connection.

The subset 8 checking the ground array operation supplies the yards according to a computed and measured topology. Some yards will be connected to the high electric potential polarity and other will keep the ground potential.

For safety reasons, yards placed in the central area of the overlapping of the two arrays will go to a high potential, while the peripheral crown will remain at ground potential, efficiently avoiding every risk of accidental shock, for example in case a passenger lets an umbrella drop under the means of transport and upon recovering it can get next to the coupled feeding system composed of the two overlapped arrays.

The necessary time for coupling to transfer the necessary energy is few seconds, after that a control subsystem stops the delivery of the recharging potential and the counter-array of the transport means is free to retract.

The driver can wait for the passengers to go into or out of the means of transport and can start again without paying any attention to the feeding system.

The feeding system by the cantilever roofs should theoretically provide powers on the order of megawatts to be transferred to vehicles, even if for few seconds. This could represent a limitation as regards the electric connection to the mains 3, but the accumulation or buffer function could be performed again by the stationary super-capacitors 4 provided as equipment of the control subsystem of the ground device.

If the vehicle rises or descends along the vehicle path, an energy recovery opportunity arises. A means of transport that is facing a descent would produce a high amount of energy by means of the regenerative braking. The excess of energy would exceed the total accumulation capability of the means of transport, and therefore a stop at a feeding station placed, hypothetically, along the descent, would be an opportunity for returning energy to the stationary infrastructure, useful for the means that in the opposite lane must face the rise.

A simple electric connection between the opposed cantilever roofs provides the functionality that sees the descending vehicle providing energy for the rise of the corresponding vehicle running along the opposite direction.

The energy feeding system according to the present invention, as previously described, strongly reduces the need of an electro-chemical accumulation of electric energy on board the means of transport, demanding to the territory the function of providing the necessary energy to the means of transport, thereby removing the autonomy problem. It is wholly clear that, under such point of view, the possible applications of the system according to the present invention are extremely numerous. In fact, in addition to allow the electric supply of vehicles for the private or public transport of people, it is well suited for its application to goods-transporting vehicles. As known, above all as regards the foodstuff chain, it is necessary to shorten the distances between production and consumption. The transport of food produced on the field can derive a storage advantage from an autonomous refrigerating vehicle that does not need fuels for operating and keeping at the desired temperature, the ground products that can decay.

As regards the optimisation, it would be uselessly costly to provide for an autonomous motoring similar to current refrigerating trucks. Therefore, it is preferable to think about a refrigerating wagon that, under a logic with everything electrical, also integrates the feeding system with a photovoltaic generation capability. The system can also in this case be energy dimensioned in order to provide for the quick load cooling and its keeping at the desired temperature. If an energy evaluation is performed about the need of a refrigerating wagon, it can be stated that it is necessary to extract approximately 120 MJ of heat per a ton of foodstuffs.

A heat pump could electrically consume a fraction of this energy, assuming, remaining conservative, 40 MJ, such dimension being compatible with the already described functionality of the feeding cantilever roofs: obviously, the means of transport can also use suitable feeding areas. Keeping the cold could be ensured by a small photovoltaic roof whose advantage would be to deliver a higher power in case of direct exposure to the sun, namely the most difficult situation. The amount of thermal insulation of the cold container is a specifics which can be easily modulated when designing depending on the provided available energy.

Similarly to the public means of transport, an alternative and feasible transport of goods could be based on the all-electric feeling model, with the chance of increasing the autonomy with a higher equipment of super-capacitors and with a greater exploitation of batteries of electro-chemical accumulators. The concept of providing the means of transport with a reduced autonomy with respect to the common availability of liquid fuels remains unchanged, relying onto the territory for accumulating energy for the mobility.

The energy feeding system according to the present invention can therefore provide a solution without compromises to the problem of transporting goods, event under medium or long range situations. Should the feeding system be extended, for example, to routes connecting big towns, an electric transport on tires could be assumed, summing the advantages of both systems.

The very short stops for feeding do not seem to be a problem since currently traffic and queues on routes impose them; moreover, since these are electric trucks, a longer autonomy could be reached without severe penalties, by increasing the equipment of super-capacitors in the means of transport.

In the specific case when a mountain pass is passed, a theoretical zeroing of the energy need for the rise would be obtained, having at the same time means of transport that descend provide the energy amount supplied by the regeneration. This is theoretical because it is always necessary to take into account the efficiencies that actual machines can offer, but the greater amount would anyway be ensured and the external energy contribution would be used only to compensate for the losses.

The invention claimed is:

1. A quick-recharging energy feeding system for a transport vehicle with electric traction, performed in every foreseen stop of the vehicle by means of a connection that can be directly and automatically performed next to the stop, through a road bed, the system comprising at least one recharging subsystem arranged on the vehicle and at least one stationary system cooperating with the recharging subsystem for transmitting electric energy;

where the recharging subsystem comprises at least one tap counter-array, the tap counter-array being equipped with electric conduction contacts and with at least one positioning system; switching devices of at least one conversion and control electronics; and at least one battery of super-capacitors connected in order to reach voltages and amperages that are compatible with the switching devices;

where the stationary system comprises at least one insulating mat equipped with plane metal contacts; and where the tap counter-array comprises spring contacts arranged so that a crown of spring ferrules performs a contact with a ground potential, the spring ferrules being spaced to avoid short-circuit phenomena through spring ferrules arranged at a center of the tap counter-array, at least one diameter of cells of the plane metal contacts of the insulating mat comprising insulation.

2. The feeding system of claim 1, where the plane metal contacts are placed on the road bed; and where the stationary system comprises switching devices of at least one managing and control electronics, and at least one battery of super-capacitors arranged next to the insulating mat, connected in order to reach voltages and amperages compatible with the switching devices of at least one managing and control electronics.

3. The feeding system of claim 1, where the electric conduction contacts are spring contacts.

4. The feeding system of claim 1, where the plane metal contacts are arranged according to an array-type arrangement on the insulating mat.

5. The feeding system of claim 1, where the stops are provided with cantilever roofs comprising the insulating mat and the battery of super-capacitors with electro-chemical accumulation capacities.

6. The feeding system of claim 5, where the cantilever roofs are connected to an electric mains.

7. The feeding system of claim 5, where the cantilever roofs comprise at least one photovoltaic solar panel adapted to produce energy to be accumulated and transferred to the vehicle.

8. The feeding system of claim 1, where a connection between the insulating mat and the tap counter-array occurs automatically during foreseen stops of the vehicle through a casual overlapping.

9. The feeding system of claim 1, where the plane metal contacts are arranged as a honeycomb.

10. The feeding system of claim 1, where the plane metal contacts comprise a surface and where the plane metal contacts are exposed on the surface and connected to a single lead embedded into the insulating mat, the lead converging to a side of the mat in order to reach a connection of the managing and control electronics.

11. The feeding system of claim 1, where the tap counter-array is actuated by at least three linear actuators to descend towards the insulating mat until a contact is stably established with the plane metal contacts of the insulating mat.

12. The feeding system of claim 1, where the plane metal contacts and the mat comprise at least two real-time diagnostics systems operating in parallel.

* * * * *